US 6,697,543 B2

(12) United States Patent
Miyata et al.

(10) Patent No.: US 6,697,543 B2
(45) Date of Patent: Feb. 24, 2004

(54) OPTICAL WAVEGUIDE FILTER

(75) Inventors: Hiroshi Miyata, Kawasaki (JP); Tadao Nakazawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 190 days.

(21) Appl. No.: 10/020,412

(22) Filed: Dec. 18, 2001

(65) Prior Publication Data

US 2003/0026558 A1 Feb. 6, 2003

(30) Foreign Application Priority Data

Jul. 17, 2001 (JP) ........................ 2001-216625

(51) Int. Cl.[7] ................................ G02B 6/00
(52) U.S. Cl. ........................................ 385/11
(58) Field of Search .................. 385/11, 15, 16, 385/37, 24, 27, 28, 45

(56) References Cited

U.S. PATENT DOCUMENTS

| | | | |
|---|---|---|---|
| 5,218,653 A | 6/1993 | Johnson et al. | 385/11 |
| 5,696,856 A | * 12/1997 | Van Der Tol | 385/28 |
| 5,850,492 A | 12/1998 | Morasca et al. | 385/11 |
| 6,128,422 A | * 10/2000 | Hodgson | 385/11 |
| 6,427,033 B1 | * 7/2002 | Hait | 385/11 |

FOREIGN PATENT DOCUMENTS

| | | |
|---|---|---|
| JP | 04-007509 | 1/1992 |
| JP | 05-088116 | 9/1993 |
| JP | 2000-171842 | 6/2000 |

* cited by examiner

*Primary Examiner*—Khiem Nguyen
(74) *Attorney, Agent, or Firm*—Staas & Halsey LLP

(57) ABSTRACT

The present invention aims at providing an optical waveguide filter for reliably selecting light of desired wavelength using polarization mode conversion, to realize a sufficient extinction ratio. To this end, according to the present invention, in an optical waveguide filter provided with an input side polarization splitting section that polarization splits light input to an input waveguide, and outputs to first and second waveguides, a mode converting section that performs polarization mode conversion on only the light corresponding to desired wavelength among the lights being propagated through the first and second waveguides, and an output side polarization splitting section that polarization splits the propagated lights of the respective waveguides having passed through the mode converting section, there is disposed a first polarization splitting section on the first waveguide and a second polarization splitting section on the second waveguide, which are positioned between the input side and output side polarization splitting sections, and a non-split component generated corresponding to a splitting rate in the input side polarization splitting section is eliminated so that only the selected light is output to an output waveguide.

14 Claims, 15 Drawing Sheets

OPTICAL WAVEGUIDE FILTER

BACKGROUND OF THE INVENTION (1) Field of the Invention

The present invention relates to an optical waveguide filter to be utilized for various optical communication devices, in particular, to an optical waveguide filter for selecting light of desired wavelength by utilizing polarization mode conversion.

(2) Related Art

FIG. 20 is a plan view showing a constitutional example of a conventional optical waveguide filter utilizing polarization mode conversion. In the conventional optical waveguide filter as shown in FIG. 20, light input to an input port $P_{IN}$ is input to a polarization beam splitter (PBS) 11 via a waveguide 1A, to be polarization split into light in TE mode and light in TM mode. The light in TE mode and the light in TM mode pass through a waveguide 2B and a waveguide 2A, respectively, to be input to a polarization mode converter 12. At the polarization mode converter 12, only the light of desired wavelength is subjected to the polarization mode conversion, due to an effect of, for example, acousto-optics effect, electro-optics effect, photo-elastic effect or the like. Then, the light that has passed through the polarization mode converter 12 is sent to a succeeding stage polarization beam splitter 13 and is split for each mode. The wavelength light that has been subjected to the mode conversion at the polarization mode converter 12 passes through a waveguide 3B and is emitted as a selected light from an output port $P_{OUT}$. The wavelength light that has not been subjected to the mode conversion passes through a waveguide 3A and is emitted as a non-selected light from an output port $P_{OUT}'$. Here, in FIG. 20, mode components corresponding to selected light are denoted in capital letters "TE, TM", and mode components corresponding to non-selected light are denoted in small letters "te, tm". The optical waveguide filter of such a constitution is utilized as a wavelength filter of polarization independency in various optical communication devices.

According to such a conventional optical waveguide filter as described in the above, however, there causes a problem in that it is difficult to obtain a large extinction ratio between the light of selected wavelength and the light of wavelength other than the selected wavelength. That is, since it is difficult to obtain a large splitting rate of the polarization beam splitter with respect to each of the light in TE mode and the light in TM mode, as shown by parenthesized mode components "(TE), (TM)" in FIG. 20, a non-split component that could not be polarization split into each mode at the polarization beam splitter 11, is output from each output end of the polarization beam splitter 11. Further, since the light in each mode including the non-split component passes through the polarization mode converter 12 to be sent to the polarization beam splitter 13, the non-split component is output from each output end of the polarization beam splitter 13. Therefore, when the splitting rate of each of the polarization beam splitters 11 and 13 is small, the non-split light of wavelength other than the selected wavelength is emitted from the output port $P_{OUT}$ for the selected light, resulting in deterioration of extinction ratio characteristics of selected light and of non-selected light.

SUMMARY OF THE INVENTION

The present invention has been achieved in view of the abovementioned problem and has an object to provide an optical waveguide filter that has realized satisfactory extinction ratio characteristics by reliably selecting light of desired wavelength by utilizing polarization mode conversion. Also, the present invention has an object to provide a technique for realizing the low-loss and miniaturization of optical waveguide filter utilizing polarization mode conversion.

In order to achieve the above objects, one aspect of an optical waveguide filter according to the present invention comprising: an input side polarization splitting section that splits light input to an input waveguide into two polarization components, and outputs one component of the two polarization components to a first waveguide and the other component to a second waveguide; a mode converting section that performs polarization mode conversion on light corresponding to selected wavelength among respective lights being propagated through the first and second waveguides; and an output side polarization splitting section that splits the respective lights being propagated through the first and second waveguides after having passed through the mode converting section, in accordance with polarization states thereof, to output the light of the selected wavelength to an output waveguide, comprises a first polarization splitting section disposed on the first waveguide positioned between the input side polarization splitting section and the output side polarization splitting section, and a second polarization splitting section disposed on the second waveguide positioned between the input side polarization splitting section and the output side polarization splitting section, wherein the respective lights being propagated through the first and second waveguides are split at the first and second polarization splitting sections in accordance with polarization states thereof, to eliminate non-split components generated corresponding to a splitting rate of the input side polarization splitting section.

According to the optical waveguide filter of such a constitution, the light input to the input waveguide is polarization split at the input side polarization splitting section and the split lights are sent to the first and second waveguides, respectively. Among the lights being propagated through the respective waveguides, the light corresponding to the selected wavelength is subjected to TE-TM mode conversion or TM-TE mode conversion at the mode converting section, while the light of other wavelength is sent to the output side polarization splitting section just as it is. At this time, the lights being propagated through the respective waveguides include, respectively, non-split components that could not be polarization split at the input polarization splitting section. However, since the propagated lights pass through the first and second polarization splitting sections, respectively, the respective non-split components are eliminated. Then, the lights propagated through the first and second waveguides, respectively, are polarization split at the output side polarization splitting section, so that the light of selected wavelength is output to the output waveguide. Thus, it becomes possible to obtain selected light of desired wavelength in which an influence of non-split components generated corresponding to the splitting rate of the input polarization splitting section is reduced, hence enabling the improvement of extinction ratio characteristics of selected light and of non-selected light.

Moreover, another aspect of the optical waveguide filter according to the present invention comprising the input side polarization splitting section, mode converting section and output side polarization splitting section as described above, comprises: a first polarization splitting section having a crossing waveguide shape that is disposed on a first waveguide positioned between the input side polarization splitting section and the output side polarization splitting section, and is capable to linearly locate the waveguide positioned between the input side polarization splitting section and also to linearly locate the waveguide positioned between the output side polarization splitting section; and a second polarization splitting section having a crossing waveguide shape that is disposed on a second waveguide positioned between the input side polarization splitting section and the output side polarization splitting section, and is capable to linearly locate the waveguide positioned between the input side polarization splitting section and also to linearly locate the waveguide positioned between the output side polarization splitting section.

According to the optical waveguide filter of such a constitution, the first polarization splitting section and the second polarization splitting section, each having a required crossing waveguide shape, are disposed on the first waveguide and the second waveguide, respectively, so that the input side polarization splitting section and the output side polarization splitting section are connected by each zone of the linear waveguide without curve. Thus, it becomes possible to reduce a loss within the optical filter due to a curve loss of waveguide or the like, and also to achieve the miniaturization of optical filter since the waveguide layout is simplified.

Other objects, features and advantages of this invention will become apparent in the following description of embodiments in relation to the attached drawings.

DETAILED DESCRIPTION OF THE INVENTION

Embodiments of the present invention will now be described with reference to the appended drawings. In respective figures, the same constituent elements are denoted by the same symbols and the description thereof will be omitted.

Figure 1:
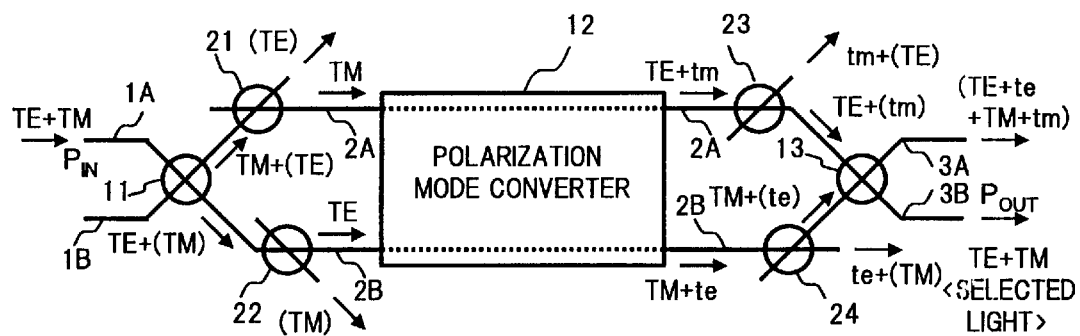
FIG. 1 is a diagram showing a constitution of a first embodiment of an optical waveguide filter according to the present invention.

FIG. 1 is a diagram showing a constitution of a first embodiment of an optical waveguide filter according to the present invention.

Figure 2:
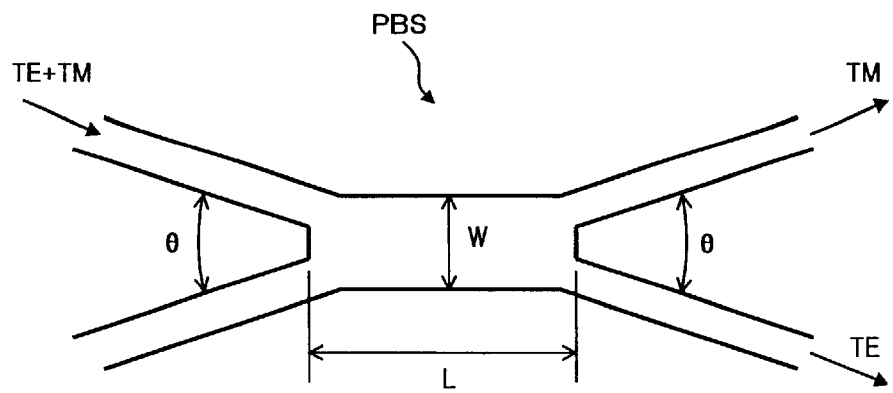
FIG. 2 is a schematic diagram showing a specific example of a polarization beam splitter used in the first embodiment.

In FIG. 1, the optical waveguide filter of the first embodiment is provided with: for the conventional constitution shown in FIG. 2 as described above, polarization beam splitters 21, 23 as a first polarization splitting section, that are disposed, respectively, in front of and behind a polarization mode converter 12 as a mode converting section, on a first waveguide 2A positioned between a polarization beam splitter 11 as an input side polarization splitting section and a polarization beam splitter 13 as an output side polarization splitting section; and polarization beam splitters 22, 24 as a second polarization splitting section, that are disposed, respectively, in front of and behind the polarization mode converter 12, on a second waveguide 2B positioned between the polarization beam splitter 11 and the polarization beam splitter 13.

For the respective polarization beam splitters 11, 13, 21 to 24, for example, a polarization beam splitter of crossing waveguide type as schematically shown in FIG. 2 or the like can be used. In such a polarization beam splitter, by optimally designing the crossing waveguide shape represented by an angle θ formed by respective waveguides crossing to each other, a length L of crossing portion and a width W and the like, it becomes possible to polarization split light input to one of the waveguides into the light in TE mode and the light in TM mode with a relatively large splitting rate, to output the respective waveguides. Specifically, when the lights in TE mode and in TM mode are input to one of the waveguides, the light polarization split into TE mode is output to the waveguide positioned at an opposite side (crossing side) to the input waveguide with the crossing portion therebetween, and the light polarization split into TM mode is output to the waveguide positioned at a same side (bar side) to the input waveguide with the crossing portion there between.

Figure 3:
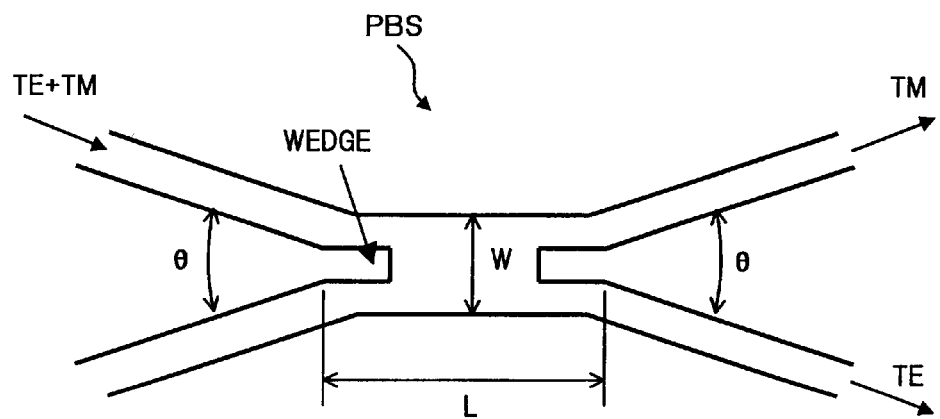
FIG. 3 is a schematic diagram showing another specific example of the polarization beam splitter used in the first embodiment.
Figure 4:
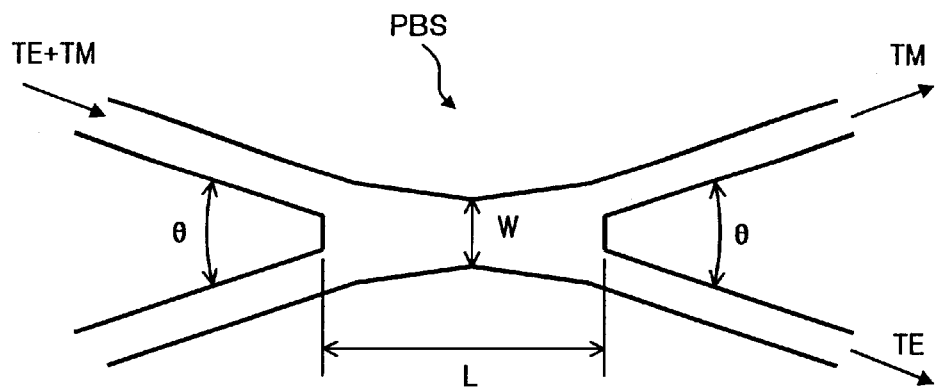
FIG. 4 is a schematic diagram showing a further specific example of the polarization beam splitter used in the first embodiment.

However, the crossing waveguide shape of the polarization beam splitter is not limited to such a shape as shown in FIG. 2. For example, as shown in FIG. 3, wedge shaped regions may be formed at meeting and branching portions of the respective waveguides. Further, for example, as shown in FIG. 4, the width of crossing portion of the respective waveguides may be narrowed at the center. Moreover, the polarized beam splitter used in the present invention is not limited to that of crossing waveguide type, and it is possible to adopt a polarization beam splitter of known constitution.

In the polarization beam splitter 11 of input stage, for example, the light from an input port $P_{IN}$ is input to a waveguide 1A positioned at the upper side in FIG. 1. Here, it is assumed that a waveguide 1B positioned at the lower side in FIG. 1 is not input with light. Then, the lights "TE+(TM)" including the light polarization split into TE mode and a non-split component in TM mode that could not be polarization split, are output to the waveguide 2B positioned at the crossing side to the waveguide 1A of the polarization beam splitter 11. The lights "TM+(TE)" including the light polarization split into TM mode and a non-split component in TE mode that could not be polarization split, are output to the waveguide 2A positioned at the bar side to the waveguide 1A.

The polarization beam splitter 21 is disposed on the waveguide 2A between the above polarization beam splitter 11 and the above polarization mode converter 12, and input and output ends thereof positioned on the bar side with the crossing portion therebetween are connected to the waveguide 2A. In this polarization beam splitter 21, among the lights "TM+(TE)" from the polarization beam splitter 11, only the TM mode component "TM" is sent to the polarization mode converter 12, while the non-split component "(TE)" in the polarization beam splitter 11 of previous stage is emitted from an output end positioned on the crossing side, to be eliminated.

Since a further non-split component "((TE))" in the succeeding stage for the non-split component "(TE)" in the previous stage becomes sufficiently smaller compared to the polarization split TM mode light "TM", an influence thereof becomes negligible. This consideration can be given for other polarization beam splitters to be described later.

The polarization beam splitter 22 is disposed on the waveguide 2B between the above polarization beam splitter 11 and the above polarization mode converter 12, and input and output ends thereof positioned on the crossing side with the crossing portion therebetween are connected to the waveguide 2B. In this polarization beam splitter 22, among the lights "TE+(TM)" from the polarization beam splitter 11, only the TE mode component "TE" is sent to the polarization mode converter 12, while the non-split component "(TM)" in the polarization beam splitter 11 of previous stage is emitted from an output end positioned on the bar side, to be eliminated.

The polarization mode converter 12 is for performing, due to an effect of, for example, acousto-optics effect, electro-optics effect, photoelastic effect or the like, polarization mode conversion, that is, TE-TM mode conversion or TM-TE mode conversion, on the light of desired wavelength selected by the present optical filter, among the respective mode lights that have been polarization split in the polarization beam splitters 21 and 22, and are propagated through the waveguides 2A and 2B.

Figure 5:
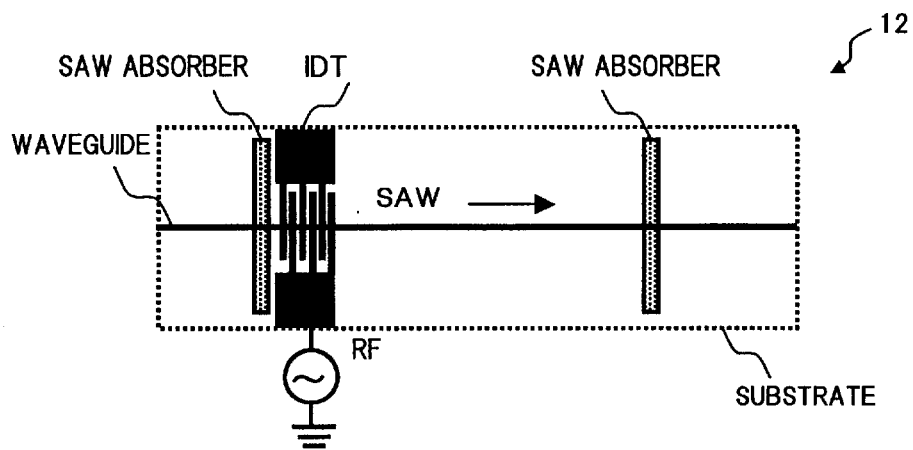
FIG. 5 is a diagram showing a main structure of a mode converter utilizing an acousto-optics effect as a specific example of a polarization mode converter used in the first embodiment.

Specifically, for the mode converter utilizing the acousto-optics effect, a so-called acousto-optic tunable filter (AOTF) having a main structure as shown in FIG. 5 can be used. In this AOTF, an interdigital transducer (IDT) is disposed on a waveguide formed on, for example, a LiNbO$_3$ substrate of X-cut, and SAW absorbers 3A are disposed in front of and behind the IDT, respectively. A surface acoustic wave (SAW) generated by applying an RF signal of required frequency to the IDT is led by an SAW guide (not shown in the figure) and propagated through the waveguide up to the SAW absorber. Thus, due to the acousto-optics effect based on SAW, among the lights being propagated through the waveguide, only the light of wavelength corresponding to SAW frequency is subjected to the polarization mode conversion. A further detailed constitutional example of AOTF will be described later.

Figure 6:
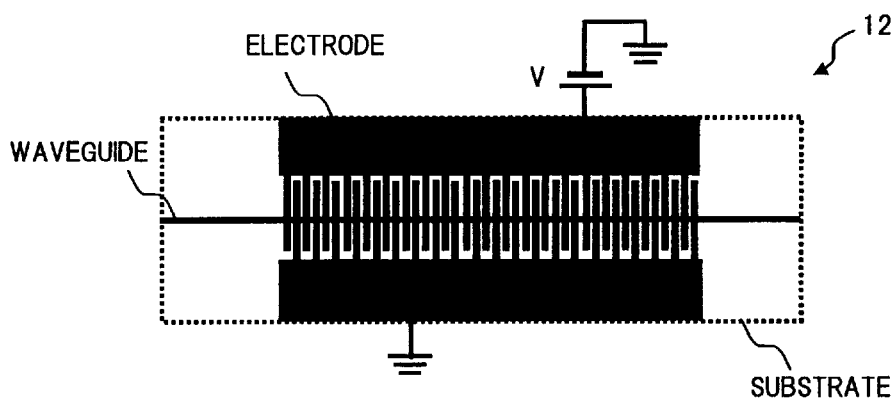
FIG. 6 is a diagram showing a main structure of a mode converter utilizing an electro-optics effect as a specific example of the polarization mode converter used in the first embodiment.

Further, for the mode converter utilizing the electro-optics effect, for example, a mode converter having a main structure as shown in FIG. 6 can be used. In this mode converter, an electrode of predetermined shape is arranged along a waveguide formed on, for example, a LiNbO$_3$ substrate of X-cut, and the polarization mode conversion is performed due to the electro-optics effect based on an electrical field generated by applying a required voltage V to the electrode.

Figure 7:
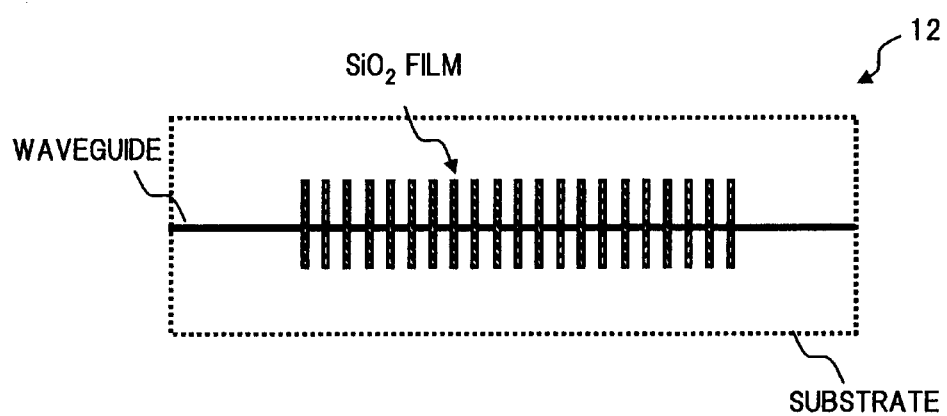
FIG. 7 is a diagram showing a main structure of a mode converter utilizing a photoelastic effect as a specific example of the polarization mode converter used in the first embodiment.

Moreover, for the mode converter using the photoelastic effect, for example, a mode converter having a main structure as shown in FIG. 7 can be used. In this mode converter, a plurality of regions each formed with SiO$_2$ film are arranged at required intervals on a waveguide formed on, for example, a LiNbO$_3$ substrate of X-cut, and the polarization mode conversion is performed due to the photoelastic effect based on each SiO$_2$ film.

In each of the above FIG. 5 to FIG. 7, only the constitutional example for a single waveguide has been shown. However, it is assumed that, for the polarization mode converter 12 used in the present embodiment, the above constitution is adopted for each of the two waveguides 2A and 2B. At this time, the above constituent elements may be provided individually for each of the waveguides 2A and 2B, so that the polarization states of the lights being propagated through the waveguides 2A and 2B are controlled independently, or alternatively, the above constituent elements may be provided commonly to the waveguides 2A and 2B, so that the polarization states of the lights being propagated through the waveguides 2A and 2B are controlled at the same time. In either of the cases, at the polarization mode converter 12, as shown in FIG. 1, among the lights in TM mode being propagated through the waveguide 2A, only the selected light of desired wavelength is converted into the light in TE mode to be output to the polarization beam splitter 23 of succeeding stage, while the non-selected light of wavelength other than the selected wavelength is sent to the polarization beam splitter 23 as it is. Also, among the lights in TE mode being propagated through the waveguide 2B, only the selected light of desired wavelength is converted into the light in TM mode to be output to the polarization beam splitter 24 of succeeding stage, while the non-selected light of wavelength other than the selected wavelength is sent to the polarization beam splitter 24 as it is.

The polarization beam splitter 23 is disposed on the waveguide 2A between the above polarization mode converter 12 and the polarization beam splitter 13 of output stage, and input and output ends thereof positioned on the crossing side with the crossing portion therebetween are connected to the waveguide 2A. In this polarization beam splitter 23, among the lights "TE+tm" from the polarization mode converter 12, the lights "TE+(tm)" including TE mode corresponding to the selected light and the non-split component are sent to the polarization beam splitter 13, while the lights "tm+(TE)" including TM mode corresponding to the non-selected light and the non-split component are emitted from an output end positioned on the bar side, to be eliminated.

The polarization beam splitter 24 is disposed on the waveguide 2B between the polarization mode converter 12 and the polarization beam splitter 13 of output stage, and input and output ends thereof positioned on the bar side with the crossing portion therebetween are connected to the waveguide 2B. In this polarization beam splitter 24, among the lights "TM+te" from the polarization mode converter 12, the lights "TM+(te)" including TM mode corresponding to the selected light and the non-split component are sent to the polarization beam splitter 13, while the lights "te+(TM)" including TE mode corresponding to the non-selected light and the non-split component are emitted from an output end positioned on the crossing side, to be eliminated.

The polarization beam splitter 13 of output stage has input ends connected with the waveguide 2A through which the lights "TE+(tm)" from the polarization beam splitter 23 are propagated, and with the waveguide 2B through which the lights "TM+(te)" from the polarization beam splitter 24 are propagated. The lights "TE+TM" in TE mode and TM mode corresponding to the selected light are output to a waveguide 3B positioned on the crossing side to the waveguide 2A, while the non-split components "(tm)+(te)" in the respective polarization beam splitters 23, 24 of previous stage and the non-split components "(TE)+(TM)" in the own stage are output to a waveguide 3A positioned on the bar side to the waveguide 2A.

Figure 8:
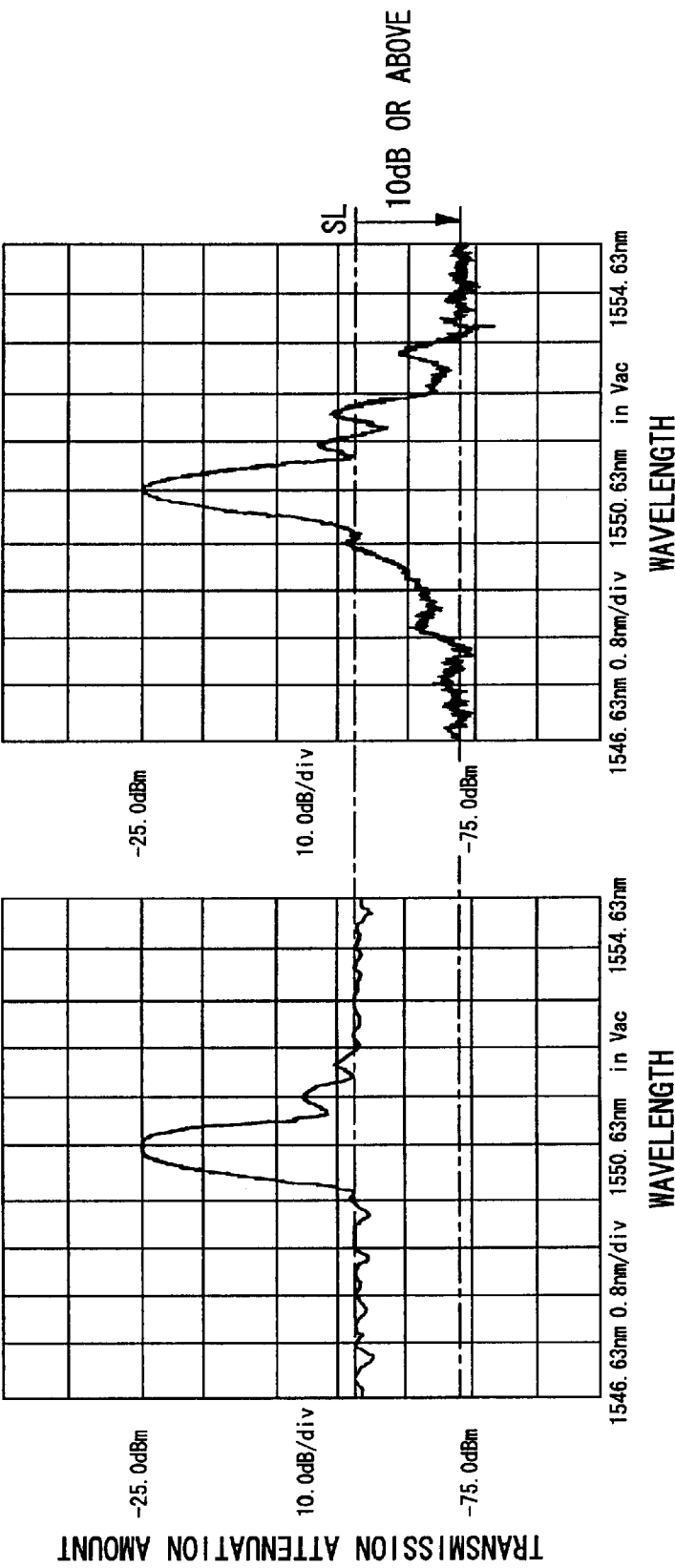
FIG. 8 is a graph for explaining an effect in the first embodiment.

As described above, according to the optical waveguide filter of the first embodiment, since the polarization beam splitters 21 to 24 are disposed, respectively, on the waveguides 2A and 2B positioned between the polarization beam splitter 11 of input stage and the polarization mode converter 12, and on the waveguides 2A and 2B positioned between the polarization mode converter 12 and the polarization beam splitter 13 of output stage, the selected light of desired wavelength that does not include substantially the non-split component generated depending on the splitting rates of the respective polarization beam splitters 11, 13, 21 to 24, is emitted from an output port $P_{OUT}$. Thus, compared to the conventional optical waveguide filter using the polarization mode conversion, it becomes possible to select reliably the light of desired wavelength to thereby achieve the improvement of extinction ratio characteristics of selected light and non-selected light. To be specific, for example, as shown in measurement results of filter characteristics in FIG. 8, by adopting the optical filter constitution according to the present invention, the optical level (side lobe level) SL of the non-selected wavelength is reduced by 10 dB or more compared to the conventional constitution, so that a sufficient extinction ratio can be realized.

Next is a description of a second embodiment according to the present invention.

Figure 9:
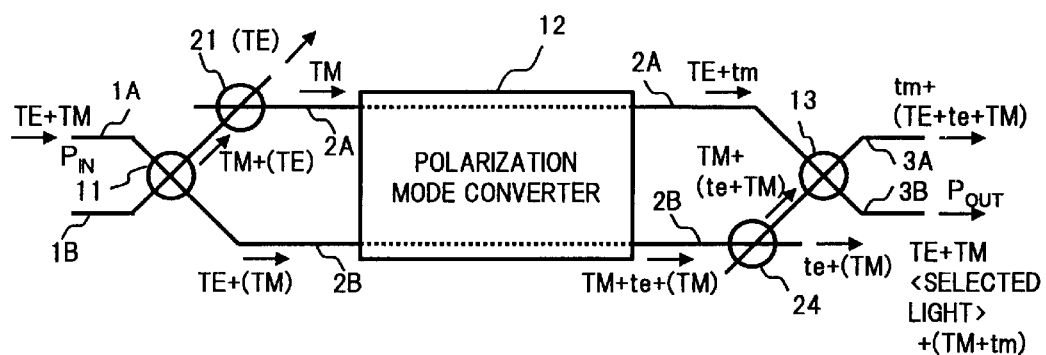
FIG. 9 is a diagram showing a constitution of a second embodiment of the optical waveguide filter according to the present invention.

FIG. 9 is a plan view showing a constitution of an optical waveguide filter of a second embodiment.

In FIG. 9, the present optical waveguide filter is for achieving the simplification of the constitution by omitting, for example, the polarization beam splitter 22 on the waveguide 2B and the polarization beam splitter 23 on the waveguide 2A from the constitution of the first embodiment shown in FIG. 1.

According to such a constitution, for the lights "TM+(TE)" passed through the polarization beam splitter 11 of input stage and output to the waveguide 2A, the non-split component "(TE)" is eliminated at the polarization beam splitter 21, the light in TM mode is input to the polarization mode converter 12, and the lights "TE+tm" obtained by converting only the light of desired wavelength into TE mode are sent to the polarization beam splitter 13 of output stage. On the other hand, the lights "TE+(TM)" passed through the polarization beam splitter 11 of input stage and output to the waveguide 2B are input to the polarization mode converter 12 as they are, and the lights "TM+te+(TM)" obtained by converting the light of desired wavelength are sent to the polarization beam splitter 24. Then, in the polarization beam splitter 24, the lights "te+(TM)" including the TE mode component corresponding to the non-selected light and the non-split component in the own stage are eliminated, and the lights "TM+(te+TM)" including the TM mode component corresponding to the selected light and the non-split components in the own stage and input stage are sent to the polarization beam splitter 13.

The polarization beam splitter 13 that has received the lights from the waveguides 2A and 2B, outputs the lights "TE+TM+(TM+tm)" including the light in TE mode and TM mode corresponding to the selected light, and the non-split components in the polarization beam splitter 24 of previous stage and in the own stage, to the waveguide 3B positioned on the crossing side to the waveguide 2A, and also outputs the lights "tm+(TE+te+TM)" including the light in TM mode corresponding to the non-selected light and the non-split components in the polarization beam splitter 24 of previous stage and in the own stage, to the waveguide 3A positioned on the bar side to the waveguide 2A.

Thus, according to the optical waveguide filter of the second embodiment, even when the polarization beam splitters 21 and 24 are disposed on the waveguide 2A positioned between the polarization beam splitter 11 of input stage and the polarization mode converter 12, and on the waveguide 2B positioned between the polarization mode converter 12 and the polarization beam splitter 13 of output stage, respectively, since the rate of non-split light included in the selected light to be emitted from the output port $P_{OUT}$ is reduced compared to the conventional constitution, it becomes possible to realize a sufficient extinction ratio and also to achieve the miniaturization of optical filter.

Figure 10:
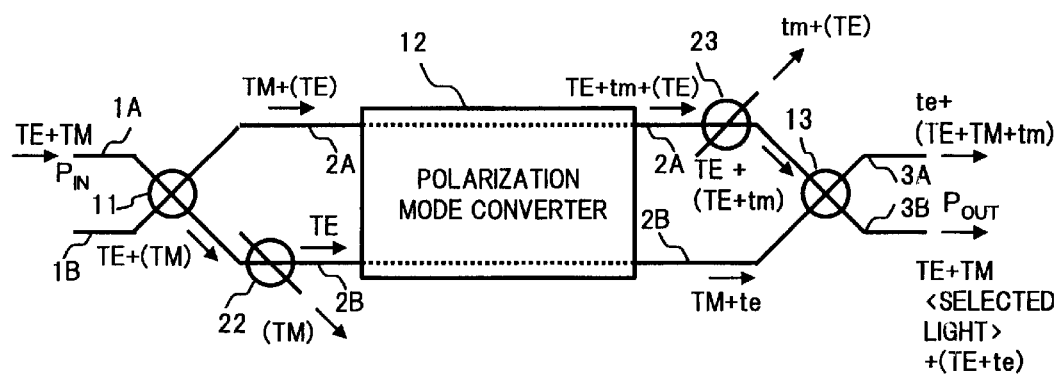
FIG. 10 is a diagram showing one example of another constitution related to the second embodiment.

In the above second embodiment, the polarization beam splitters 21 and 24 have been disposed on the input side of waveguide 2A and on the output side of waveguide 2B, respectively. However, the constitution may be such that the polarization beam splitters 23 and 22 are disposed on the output side of waveguide 2A and the input side of waveguide 2B, respectively, for example as shown in FIG. 10, so that the polarization beam splitters 21 and 24 in the constitution of FIG. 1 are omitted. In this case, the waveguide 3B is input with the lights "TE+TM+(TE+te)" including the light in TE mode and TM mode corresponding to the selected light, and the non-split components in the polarization beam splitter 23 and in the own stage. The waveguide 3A is input with the lights "te+(TE+TM+tm)" including the light in TE mode corresponding to the non-selected light and the non-split components in the polarization beam splitter 23 and in the own stage. Further, although not shown in the figure, the constitution may be such that the polarization beam splitters 21 and 22 are disposed on the previous stage side of the polarization mode converter 12 on the waveguides 2A and 2B, to omit the polarization beam splitters 23 and 24 on the succeeding stage side, or, alternatively, the polarization beam splitters 23 and 24 are disposed on the succeeding stage side to omit the polarization beam splitters 21 and 22 on the previous stage side.

Next is a description of a third embodiment of the present invention.

Figure 11:
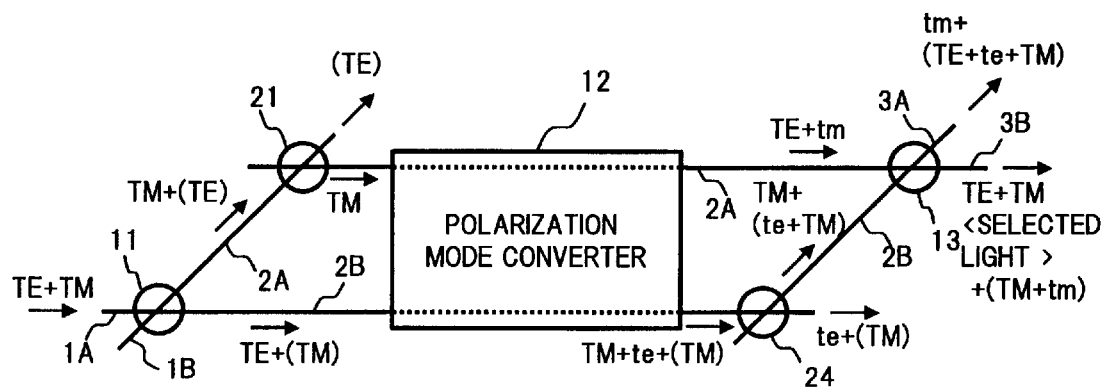
FIG. 11 is a diagram showing a constitution of a third embodiment of the optical waveguide filter according to the present invention.

In FIG. 11, the present optical waveguide filter is to improve the crossing waveguide shape of each of the polarization beam splitters 11, 13, 21 and 24 in the constitution of the second embodiment shown in FIG. 9 to provide the waveguides in the optical filter with the linear layout without curve, so as to achieve the reduction of a curve loss in waveguide, a loss in each of the polarization beam splitters and the like.

Figure 12:
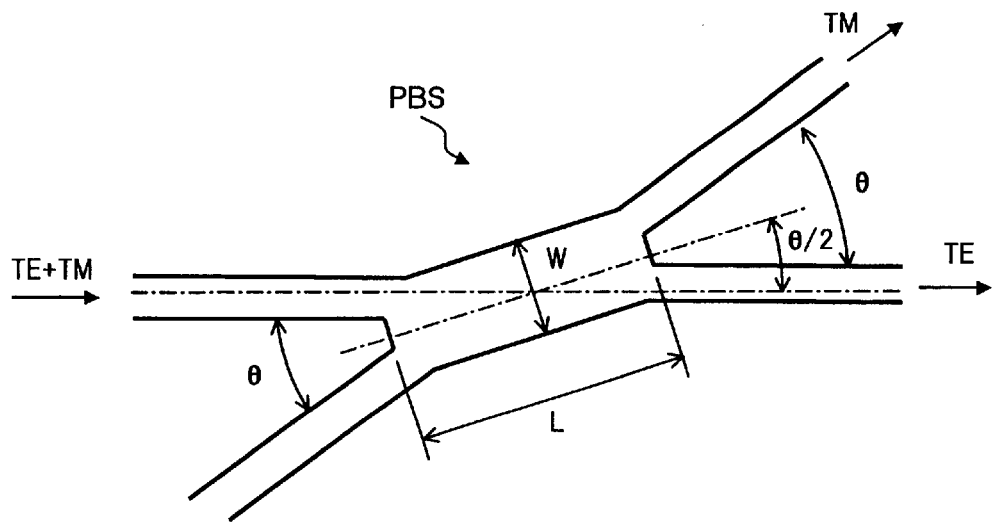
FIG. 12 is a schematic diagram showing a specific example of a polarization beam splitter used in the third embodiment.

For each of the polarization beam splitters 11, 13, 21 and 24, for example, a polarization beam splitter having a crossing waveguide shape as shown in a schematic diagram of FIG. 12 is used. This crossing waveguide shape is made up so that the input and output waveguides positioned on the crossing sides to each other with the crossing portion therebetween form a substantial linearity, and a longitudinal direction of the crossing portion inclines to the linearity. To be specific, if an angle formed by the crossing two linear waveguides is θ, it is desirable to design such that an inclined angle in the longitudinal direction of the crossing portion with respect to the input and output waveguides formed in linear, becomes θ/2.

By adopting such a crossing waveguide shape to each of the polarization beam splitters 11, 13, 21 and 24, it is possible to exclude curved portion in each of the input and output side waveguides of each polarization beam splitter. Thus, it becomes possible to realize the optical waveguide filter of the low-loss and miniaturization.

Here, the present invention will be described in further detail while showing specific examples of the third embodiment.

Figure 13:
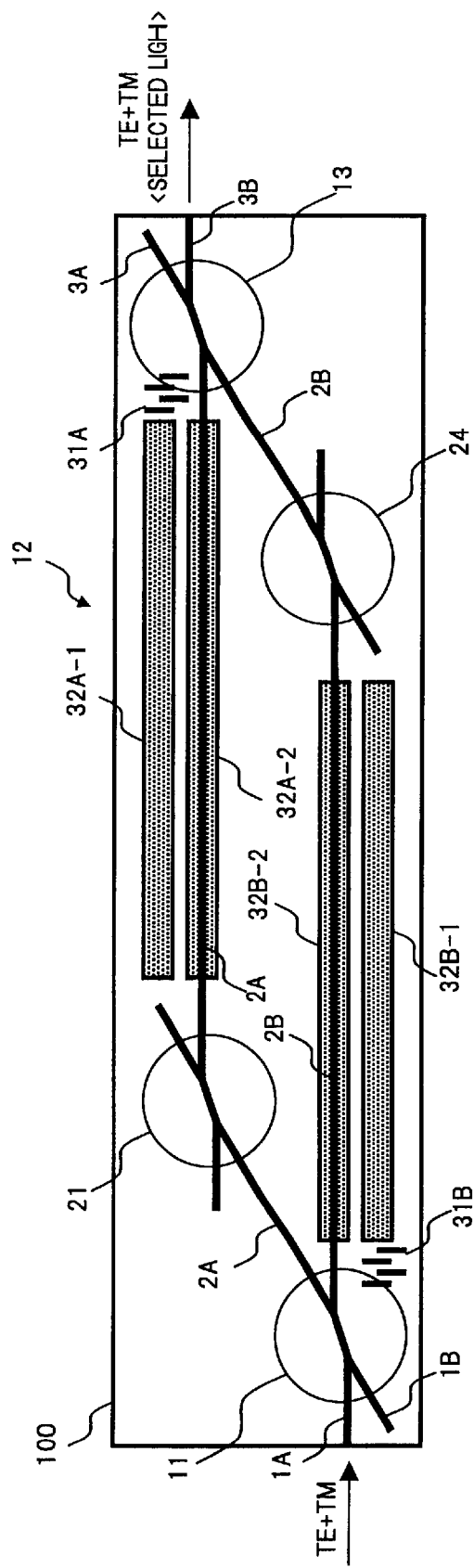
FIG. 13 is a schematic diagram showing a specific example adopted with an AOTF using a directional coupling type SAW guide.

FIG. 13 is a plan view showing a constitution of specific example related to the third embodiment.

In the specific example of FIG. 13, for the polarization mode converter 12, an AOTF using a SAW guide of so-called directional coupling type that is one of AOTFs utilizing the acousto-optics effect, is used. And, the polarization beam splitter having crossing waveguide shape as shown in FIG. 12 is applied to each of the polarization beam splitters 11, 13, 21 and 24.

In the above AOTF of directional coupling type, IDTs 31A and 31B are arranged corresponding to the waveguides 2A and 2B formed on a substrate 100, respectively, and SAW guides 32A-1 and 32A-2 of required shape are disposed adjacent to each other to directional couple SAW generated at the IDT 31A, so that SAW generated at the IDT 31A most strongly interfere the light being propagated within the waveguide 2A in the vicinity of the center of mode conversion area. Further, SAW guides 32B-1 and 32B-2 of required shape are disposed adjacent to each other to directional couple SAW generated at the IDT 31B, so that SAW generated at the IDT 31B most strongly interfere the light being propagated within the waveguide 2B in the vicinity of the center of mode conversion area. Although not shown in the figure, SAW absorbers may be disposed on the outside of the opposite ends in the longitudinal direction of each of the SAW guides 32A and 32B, for absorbing SAW propagated through the surface of substrate 100.

Here, the constitution is such that the IDT 31A on the waveguide 2A side is arranged on the output side so that SAW generated at the IDT 31A is propagated in a direction reverse to the propagation direction of light in the waveguide 2A. Also, the IDT 31B on the waveguide 2B side is arranged on the input side so that SAW generated at the IDT 31B is propagated in the same direction (forward direction) as the propagation direction of light in the waveguide 2B. Such a relation of the propagation direction of SAW to the propagation direction of light is set taking into consideration of an influence of frequency shift due to Doppler effect generated at polarization mode conversion.

The frequency shift due to Doppler effect at polarization mode conversion is, to be specific, a phenomenon wherein a frequency of selected light to be subjected to polarization mode conversion is changed by a frequency of SAW due to Doppler effect. A direction of this frequency shift of selected light is known as being dependent on the polarization mode conversion direction and the relative propagation directions between the surface acoustic wave and the light, as shown in next Table 1.

TABLE 1

| | | Direction of Polarization Mode Conversion | |
|---|---|---|---|
| | | TE → TM | TM → TE |
| Relative Propagation Direction between SAW and Light | Forward Direction | +f | −f |
| | Reverse Direction | −f | +f |

In the table 1, "f" is a shift amount of frequency, and shift directions are represented by positive and negative signs assigned to the respective shift amounts.

In the above specific example, since the light and SAW are propagated in the reverse direction on the waveguide 2A side, the frequency of the selected light is shifted by +f when the conversion from TM mode into TE mode occurs. On the other hand, the light and SAW are propagated in the forward direction on the waveguide 2B side, the frequency of the selected light is shifted by +f when the conversion from TE mode into TM mode occurs. Thus, the optical filter is designed such that the frequency shifts in the waveguides 2A and 2B due to Doppler effect at the polarization mode conversion coincide with each other, so that the frequencies of the selected lights propagated through the waveguides 2A and 2B, to be synthesized at the polarization beam splitter 13 of output stage accurately coincide with each other. Hence, it becomes possible to reliably select the light of desired wavelength.

The arrangement of IDTs 31A and 31B in the present invention is not limited to the example of FIG. 13, and it is possible to adopt an arbitrary arrangement so that the frequency shifts in the waveguides 2A and 2B due to Doppler effect coincide with each other in accordance with the relation in Table 1.

As described above, by adopting the crossing waveguide shape in which the crossing portion is inclined, to each of the polarization beam splitters 11, 13, 21 and 24, and using the AOTF of directional coupling type for the polarization mode converter 12, it also becomes possible to provide the optical waveguide filter of the low-loss and miniaturization, capable of achieving a sufficient extinction ratio.

Figure 14:
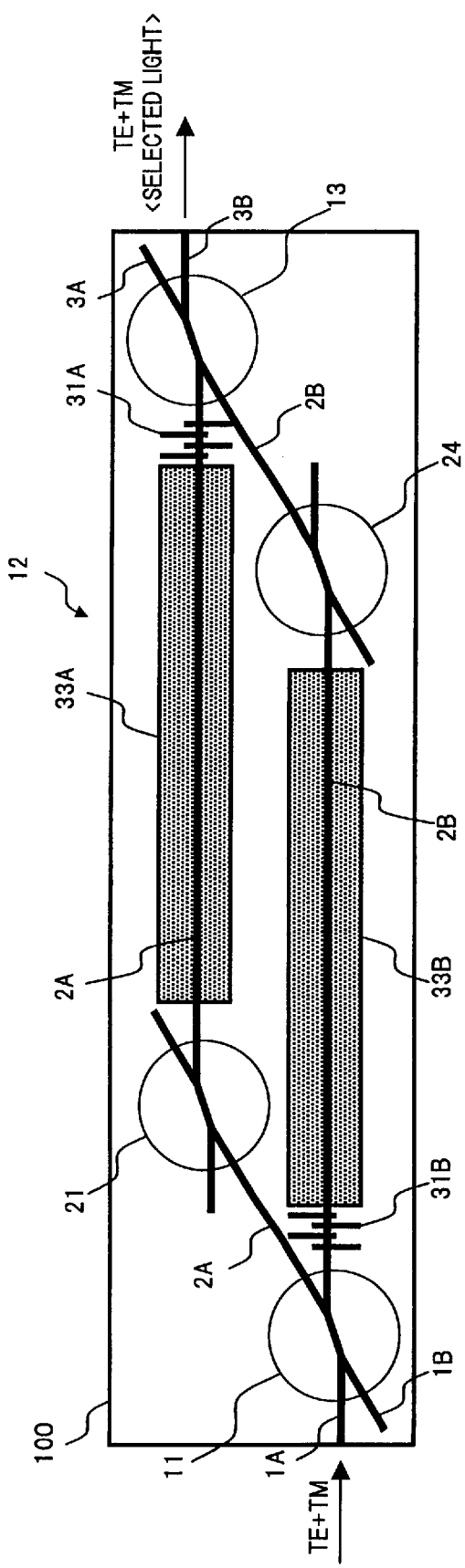
FIG. 14 is a schematic diagram showing a specific example adopted with an AOTF using a film type SAW guide.
Figure 15:
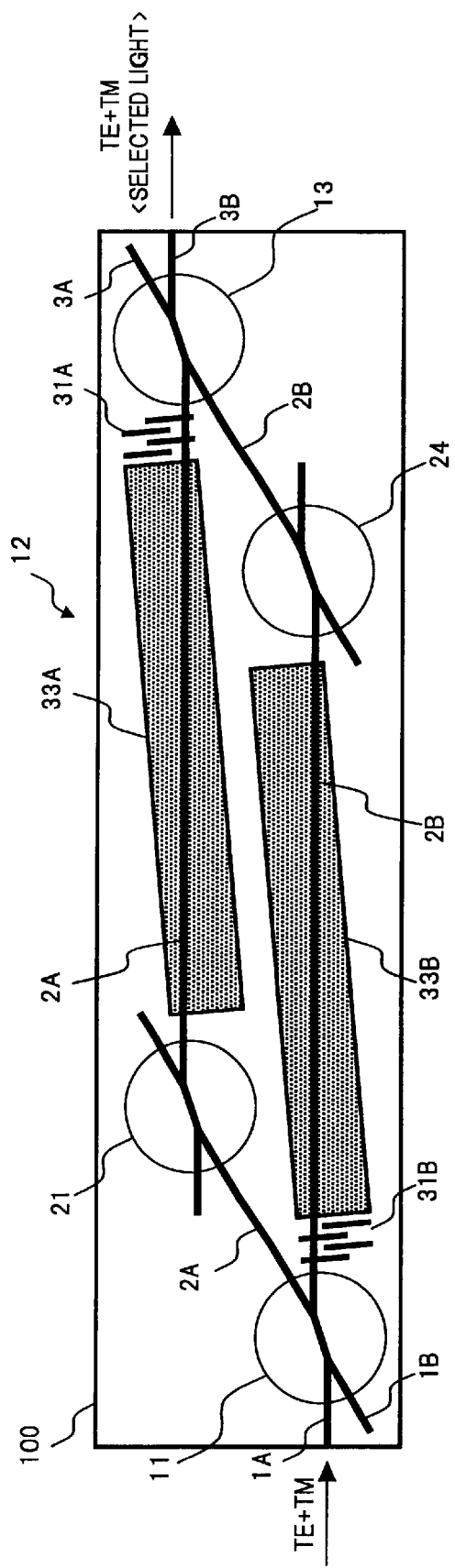
FIG. 15 is a diagram showing an applied example for achieving the suppression of side lobe level with respect to the specific example in FIG. 14.

In the above specific example, the description has been given for a case where the AOTF of directional coupling type is used for the polarization mode converter 12. However, the present invention is not limited thereto. For example, an AOTF using an SAW guide of thin film as shown in FIG. 14 can also be used. To be specific, the IDTs 31A and 31B, and thin film SAW guides 33A and 33B are disposed along the waveguides 2A and 2B form on the substrate 100, respectively. SAW generated in each of the IDTs 31A and 31B is introduced by each of the thin film SAW guides 33A and 33B, to be propagated on each of the waveguides 2A and 2B. In addition, the AOTF using these thin film SAW guides may have an arrangement, for example, as shown in FIG. 15, so that the longitudinal directions of the SAW guides 33A and 33B are set to be inclined by required amount with respect to the axial directions of the waveguides 2A and 2B, and the propagation axis of SAW and the optical axis cross with each other at an oblique angle. By adopting such an arrangement, the strength of surface acoustic wave sensed by the light is weighted in the longitudinal direction, thus it becomes possible to achieve the suppression of side lobe level of filter characteristics.

Figure 16:
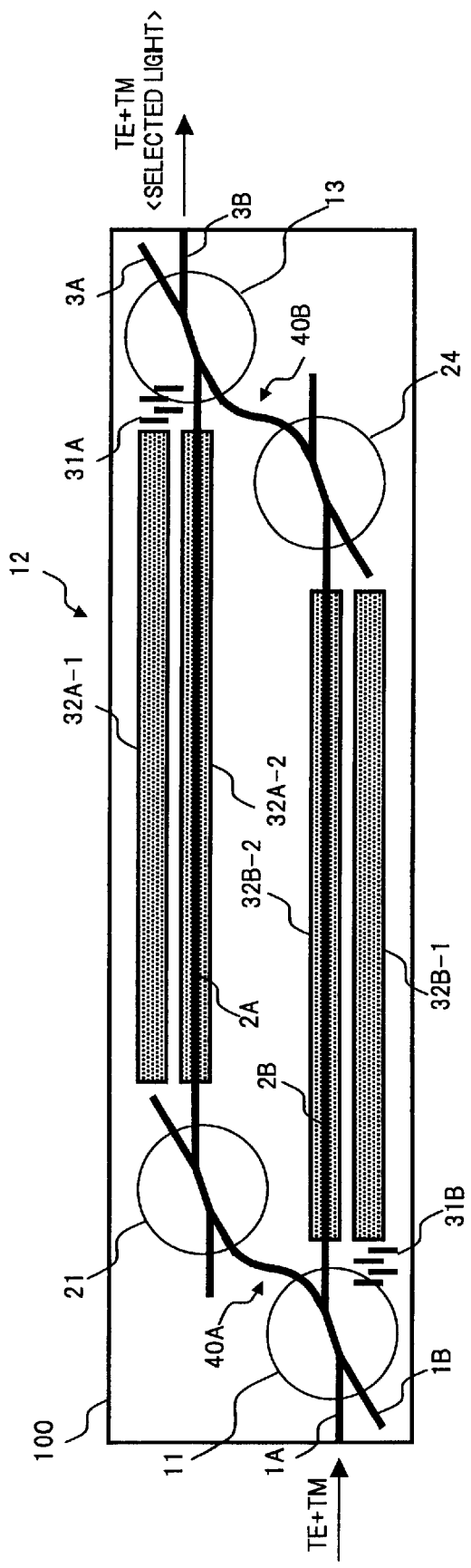
FIG. 16 is a diagram showing a modified example for achieving the expansion of mode conversion area using a waveguide of a gentle curve with respect to the specific example in FIG. 13.

Also, in the specific example shown in FIG. 13, between the two polarization beam splitters 11 and 21 of input side, and between the two polarization beam splitters 24 and 13 of output side have been connected by the linear waveguides, respectively. However, for example, as shown in another specific example in FIG. 16, it is possible to adopt an application wherein between the above respective splitters are connected by waveguides each using a gentle curve (for example, S shaped curve and the like having 100 mm or above of radius of curvature). By adopting the waveguide of such a layout, it is possible to expand the mode conversion area in the polarization mode converter 12 in the propagation direction of light. Thus, it becomes possible to increase the degree of freedom of optical filter design.

A fourth embodiment of the present invention will be described.

Figure 17:
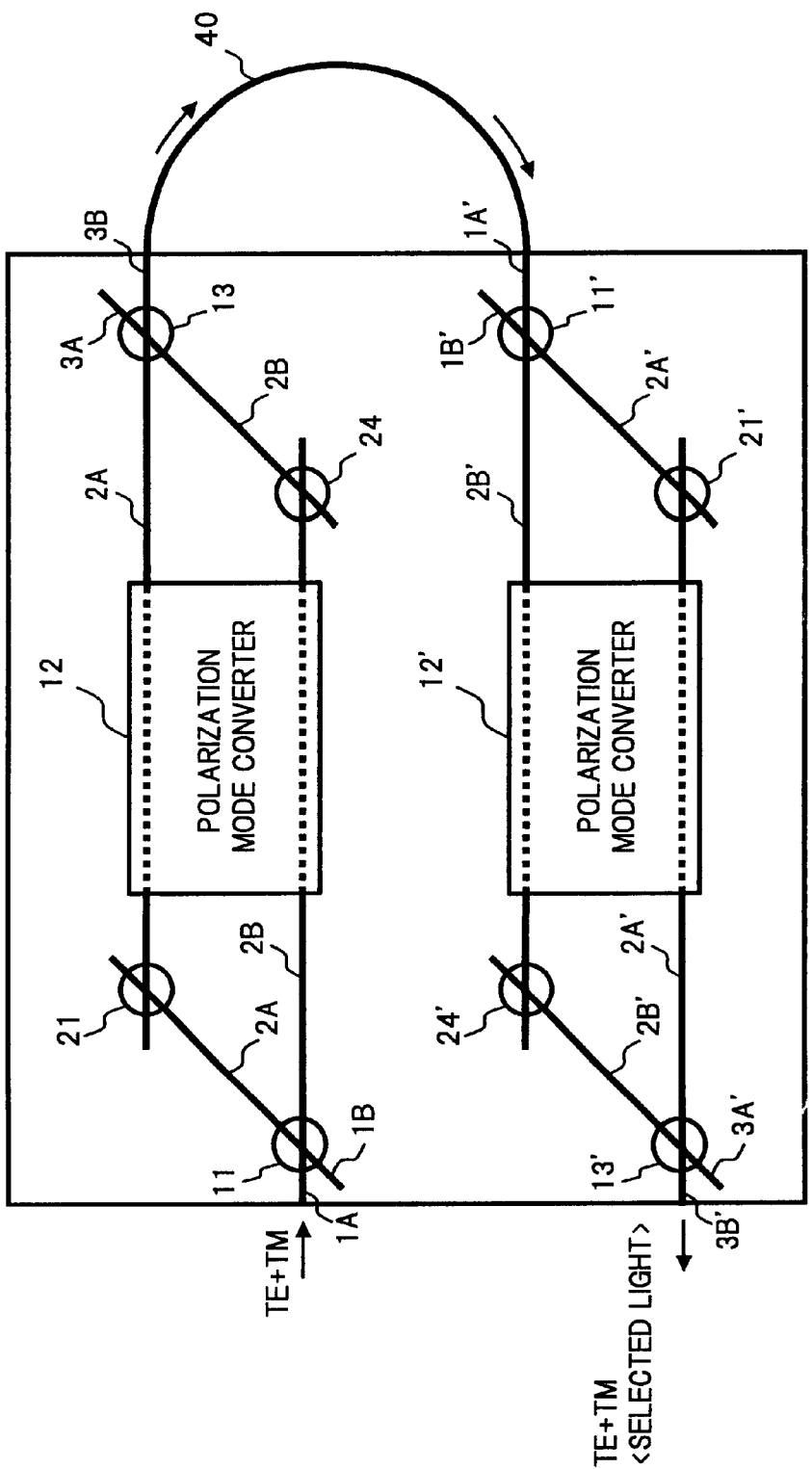
FIG. 17 is a diagram showing a constitution of a fourth embodiment of the optical waveguide filter according to the present invention.

FIG. 17 is a plan view showing a constitution of an optical waveguide filter of the fourth embodiment.

In FIG. 17, the present optical waveguide filter is made up to a two-stage constitution by connecting in series two optical filters of the same constitution as in the third embodiment shown in FIG. 11. Here, the optical filters having the same constitution for the respective stages are formed on a single substrate, and one end of the waveguide 3B from which the light selected at the previous stage optical filter is output, is connected to one end of an input waveguide 1A' in the succeeding stage optical filter through an optical fiber 40. In this figure, the same reference numbers with the prime symbol (') are assigned to respective constituent elements of the succeeding stage optical filter corresponding to the respective constituent elements of the previous stage optical filter, to indicate the corresponding relation in the two-stage constitution.

In the optical waveguide filter of such a two-stage constitution, similar to the third embodiment, the light in TE mode and the light in TM mode having desired wavelengths selected at the previous stage optical filter are sent to the succeeding stage optical filter via the optical fiber 40, and also at the succeeding stage optical filter, the light of desired wavelength is selected.

As described above, by connecting the two optical filters in series to form a two-stage constitution, it becomes possible to obtain more acute filter characteristics, thereby enabling of more reliably selecting the light of desired wavelength.

In the fourth embodiment, one example of two-stage constitution has been described. However, in the present invention, it is possible to form a multi-stage constitution by connecting in series more than three optical filters. Further, this multi-stage constitution can be adopted not only to the third embodiment, but also to the respective constitutions in the first and second embodiments and further to a constitution combined these embodiments.

Figure 18:
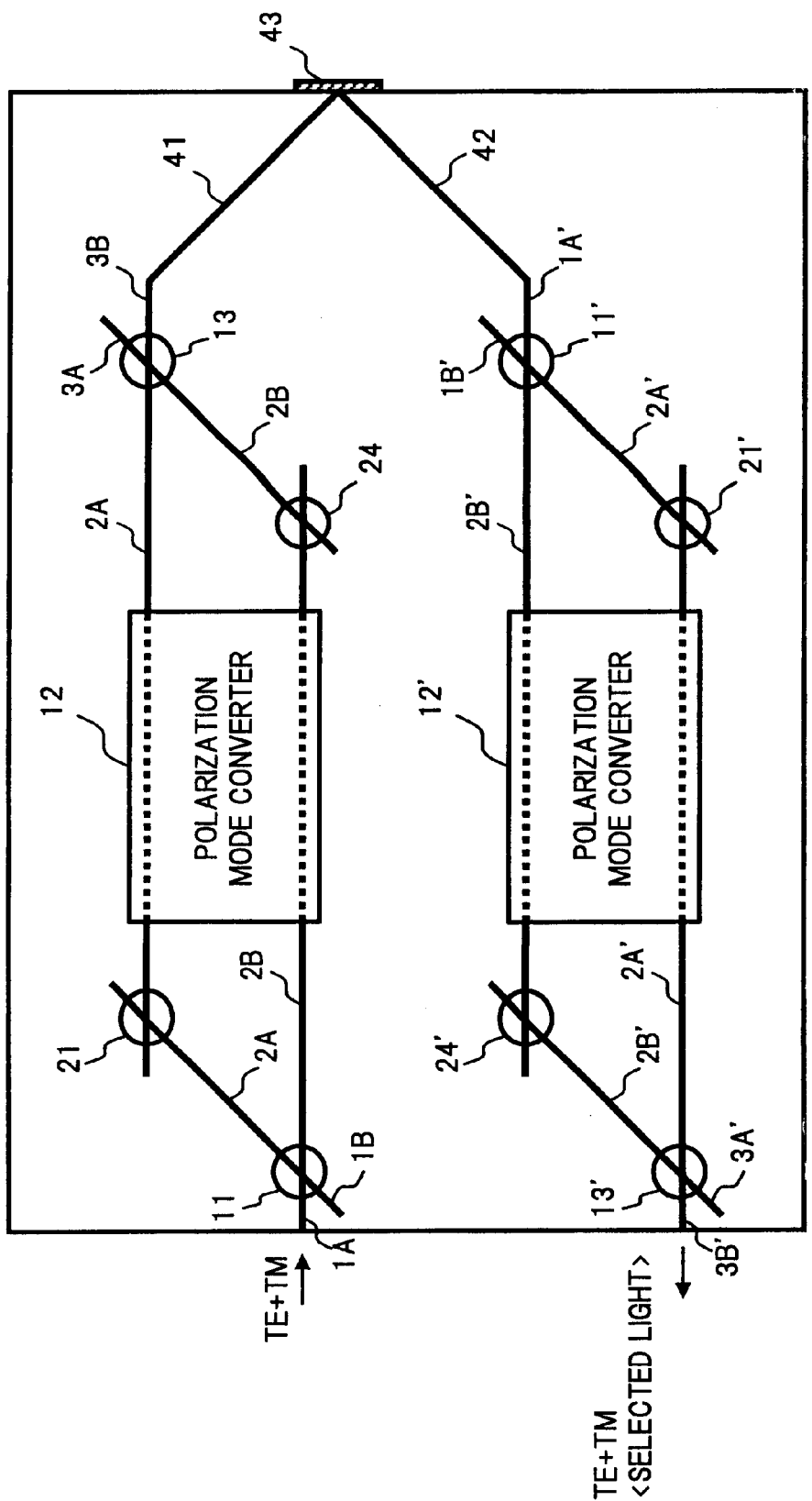
FIG. 18 is a diagram showing another constitutional example related to the fourth embodiment.

Moreover, in the fourth embodiment, the output waveguide 3B of the previous stage optical filter has been connected to the input waveguide 1A' of the succeeding stage optical filter at the outside of the substrate using the optical fiber 40. However, for example, as shown in FIG. 18, the constitution may be such that a waveguide 41 extended from the output waveguide 3B of previous stage contacts with a waveguide 42 extended from the input waveguide 1A' of succeeding stage at an end face of the substrate, and an optical reflector 43 is disposed on the contact end face so that the light selected in the previous stage optical filter is folded at the interior of the substrate to be sent to the succeeding stage optical filter.

Figure 19:
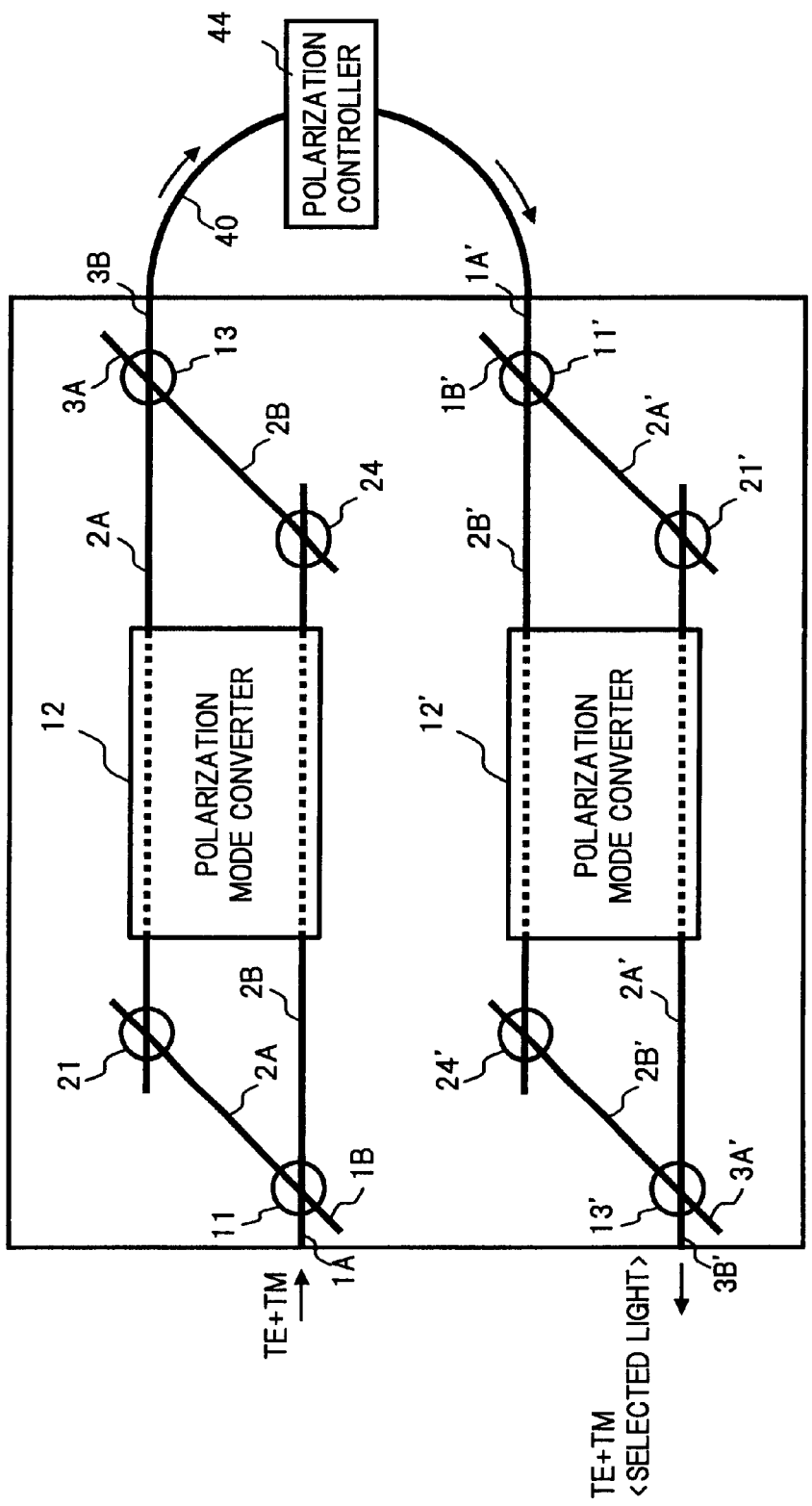
FIG. 19 is a diagram showing an applied example related to the fourth embodiment.
Figure 20:
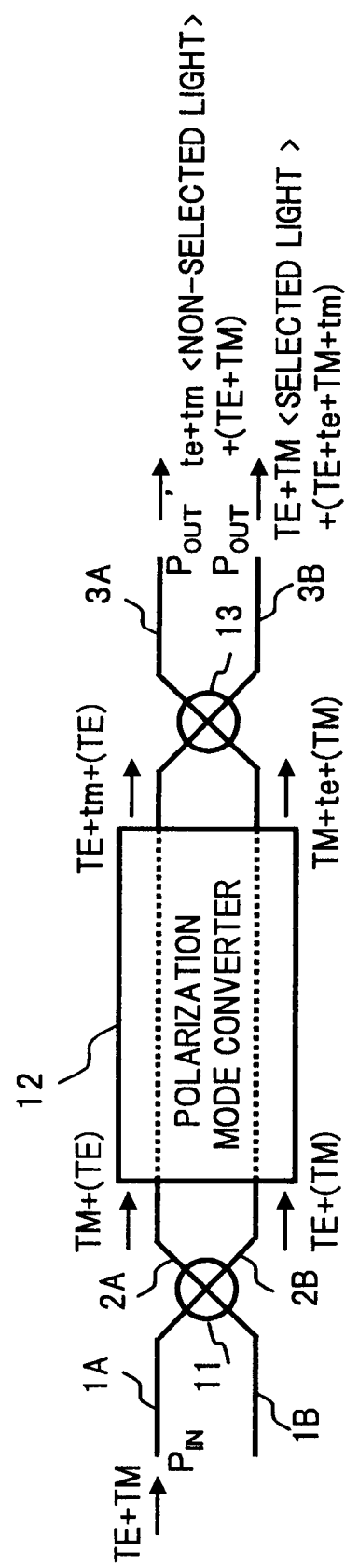
FIG. 20 is a diagram showing a constitution of conventional optical waveguide filter.

For an applied example of the fourth embodiment, as shown in FIG. 19, a polarization controller 44 capable of arbitrarily controlling the polarization state of the propagated light may be disposed on the half way of the optical fiber 40 that connects the previous and succeeding stages. Hence, by disposing the polarization controller 44, it becomes possible to control the polarization state of the selected light sent from the previous stage to the succeeding stage, so that for example an influence of remaining polarization mode dispersion (PMD) generated in the previous stage optical filter is offset by the same phenomenon generated in the succeeding stage optical filter.

What is claimed:

1. An optical waveguide filter comprising:
    an input side polarization splitting section that splits light input to an input waveguide into two polarization components, and outputs one component of the two polarization components to a first waveguide and the other component to a second waveguide;
    a mode converting section that performs polarization mode conversion on light corresponding to selected wavelength among respective lights being propagated through said first and second waveguides; and
    an output side polarization splitting section that splits the respective lights being propagated through said first and second waveguides after having passed through said mode converting section, in accordance with polarization states thereof, to output the light corresponding to said selected wavelength to an output waveguide,
    said optical waveguide filter further comprising:
        a first polarization splitting section disposed on said first waveguide positioned between said input side polarization splitting section and said output side polarization splitting section; and
        a second polarization splitting section disposed on said second waveguide positioned between said input side polarization splitting section and said output side polarization splitting section,
        wherein the respective lights being propagated through said first and second waveguides are split at said first and second polarization splitting sections, in accordance with polarization states thereof, to eliminate non-split components generated corresponding to a splitting rate of said input side polarization splitting section.

2. An optical waveguide filter according to claim 1, wherein
    said first polarization splitting section is disposed on at least one of said first waveguide positioned between said input side polarization splitting section and said mode converting section, and said first waveguide positioned between said mode converting section and said output side polarization splitting section, and
    said second polarization splitting section is disposed on at least one of said second waveguide positioned between said input side polarization splitting section and said mode converting section, and said second waveguide positioned between said mode converting section and said output side polarization splitting section.

3. An optical waveguide filter according to claim 2, wherein
said first polarization splitting section is disposed on said first waveguide positioned between said input side polarization splitting section and said mode converting section, and
said second polarization splitting section is disposed on said second waveguide positioned between said mode converting section and said output side polarization splitting section.

4. An optical waveguide filter according to claim 2, wherein
said first polarization splitting section is disposed on said first waveguide positioned between said mode converting section and said output side polarization splitting section, and
said second polarization splitting section is disposed on said second waveguide positioned between said input side polarization splitting section and said mode converting section.

5. An optical waveguide filter according to claim 1, wherein
each of said first and second polarization splitting sections has a crossing waveguide shape capable to linearly locate the waveguide positioned between said input side polarization splitting section, and also capable to linearly locate the waveguide between said output side polarization splitting section.

6. An optical waveguide filter according to claim 1, wherein
each of said input side and output side polarization splitting sections has a crossing waveguide shape capable to make respective axial directions of said input and output waveguides substantially parallel with each other.

7. An optical waveguide filter according to claim 1, wherein
said mode converting section performs polarization mode conversion based on an acousto-optics effect.

8. An optical waveguide filter according to claim 1, wherein
said mode converting section is provided with a surface acoustic wave such that frequency shifts due to Doppler effect generated at polarization mode conversion coincide with each other for the respective lights being propagated through said first and second waveguides.

9. An optical waveguide filter according to claim 1, wherein
said mode converting section performs polarization mode conversion based on an electro-optics effect.

10. An optical waveguide filter according to claim 1, wherein
said mode converting section performs polarization mode conversion based on a photoelastic effect.

11. An optical waveguide filter, wherein
said optical waveguide filter recited in claim 1 is made a single unit structure, and a plurality of said unit structures are connected in series through a connecting optical path.

12. An optical waveguide filter according to claim 11, wherein
there is provided a polarization controlling section capable of controlling the polarization state of light being propagated through said connecting optical path.

13. An optical waveguide filter comprising:
an input side polarization splitting section that splits light input to an input waveguide into two polarization components, and outputs one component of the two polarization components to a first waveguide and the other component to a second waveguide;
a mode converting section that performs polarization mode conversion on light corresponding to selected wavelength among respective lights being propagated through said first and second waveguides; and
an output side polarization splitting section that splits the respective lights being propagated through said first and second waveguides after having passed through said mode converting section, in accordance with polarization states thereof, to output the light corresponding to said selected wavelength to an output waveguide,
said optical waveguide filter further comprising:
a first polarization splitting section having a crossing waveguide shape that is disposed on said first waveguide positioned between said input side polarization splitting section and said output side polarization splitting section, and is capable to linearly locate the waveguide positioned between said input side polarization splitting section and also to linearly locate the waveguide positioned between said output side polarization splitting section; and
a second polarization splitting section having a crossing waveguide shape that is disposed on said second waveguide positioned between said input side polarization splitting section and said output side polarization splitting section, and is capable to linearly locate the waveguide positioned between said input side polarization splitting section and also to linearly locate the waveguide positioned between said output side polarization splitting section.

14. An optical waveguide filter according to claim 13, wherein
each of said first and second polarization splitting sections has a crossing waveguide shape capable to make respective axial directions of said input and output waveguides substantially parallel with each other.

* * * * *